United States Patent
Zhang et al.

(10) Patent No.: US 9,450,662 B2
(45) Date of Patent: Sep. 20, 2016

(54) EVOLVED NODE-B, USER EQUIPMENT, AND METHODS FOR CHANNEL QUALITY INDICATOR (CQI) FEEDBACK

(71) Applicant: Intel IP Corporation, Santa Clara, CA (US)

(72) Inventors: Yushu Zhang, Beijing (CN); Yuan Zhu, Beijing (CN); Qinghua Li, San Ramon, CA (US); Xiaogang Chen, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/670,692

(22) Filed: Mar. 27, 2015

(65) Prior Publication Data

US 2016/0142123 A1 May 19, 2016

Related U.S. Application Data

(63) Continuation of application No. PCT/CN2014/091012, filed on Nov. 13, 2014.

(51) Int. Cl.
*H04L 1/02* (2006.01)
*H04B 7/06* (2006.01)
*H04B 7/04* (2006.01)
*H04W 84/04* (2009.01)

(52) U.S. Cl.
CPC .......... *H04B 7/0632* (2013.01); *H04B 7/0452* (2013.01); *H04W 84/042* (2013.01)

(58) Field of Classification Search
CPC ..... H04L 1/0026; H04L 5/0057; H04L 1/06; H04L 1/1867; H04L 5/0055; H04L 1/02; H04L 27/362; H04L 5/023; H04B 7/0647; H04B 7/02

USPC ......................... 375/260, 267, 299
See application file for complete search history.

(56) References Cited

U.S. PATENT DOCUMENTS

| 9,019,856 B2* | 4/2015 | Papasakellariou .. H04W 72/042 370/252 |
| 2012/0270535 A1* | 10/2012 | Chen ..................... H04W 24/10 455/422.1 |
| 2013/0322393 A1* | 12/2013 | Kishiyama ............ H04L 5/0057 370/329 |
| 2015/0049706 A1* | 2/2015 | Lee ........................ H04L 5/0035 370/329 |
| 2015/0200761 A1* | 7/2015 | Kim ...................... H04L 1/1867 370/280 |
| 2015/0200762 A1* | 7/2015 | Kim ...................... H04L 1/1867 370/329 |
| 2015/0244443 A1* | 8/2015 | Papasakellariou .. H04W 72/042 370/329 |
| 2016/0135143 A1* | 5/2016 | Won .................... H04W 72/005 370/312 |

* cited by examiner

*Primary Examiner* — Emmanuel Bayard
(74) *Attorney, Agent, or Firm* — Schwegman Lundberg & Woessner, P.A.

(57) ABSTRACT

Embodiments of User Equipment (UE), an Evolved Node-B (eNB), and methods for channel quality indicator (CQI) feedback are disclosed herein. An aperiodic CQI type parameter received at the UE may indicate a CQI type for use in a determination of an aperiodic CQI based on signals received from the eNB. Channel-state information reference signals (CSI-RS) may be used when single-user multiple-input multiple-output (SU-MIMO) signals are received. Physical downlink shared channel (PDSCH) blocks may be used when multi-user multiple-input multiple-output (MU-MIMO) signals are received. The aperiodic CQI may be transmitted to the eNB as part of an aperiodic CQI measurement report. In addition, periodic CQI measurement reports may also be transmitted to the eNB and may include periodic CQIs that are based on CSI-RS received at the UE.

26 Claims, 7 Drawing Sheets

EVOLVED NODE-B, USER EQUIPMENT, AND METHODS FOR CHANNEL QUALITY INDICATOR (CQI) FEEDBACK

PRIORITY CLAIM

This application is a continuation under 35 U.S.C. 111(a) of International Application PCT/CN2014/091012, filed Nov. 13, 2014, [reference number P77875PCT-Z (4884.243WO1)], which is incorporated herein by reference in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to channel quality indicator (CQI) feedback, especially CQI feedback for multi-user multiple-input multiple-output (MU-MIMO) communication.

BACKGROUND

Communication between User Equipment (UE) and an Evolved Node-B (eNB) may be performed in various multiple-input multiple-output (MIMO) configurations, in which both the UE and the eNB may utilize multiple antennas. As part of single-user MIMO (SU-MIMO) downlink operation, data intended exclusively for the UE may be transmitted by the eNB in a group of time and frequency resources. In contrast, the same resources may be allocated for multi-user MIMO (MU-MIMO) downlink operation, in which overlapping time and frequency resources may be used to send data to each of multiple UEs. MU-MIMO operation may offer improved throughput or capacity in comparison to SU-MIMO operation, although some related tasks may be challenging. As such, there is a general need for methods and systems that enable MU-MIMO operation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
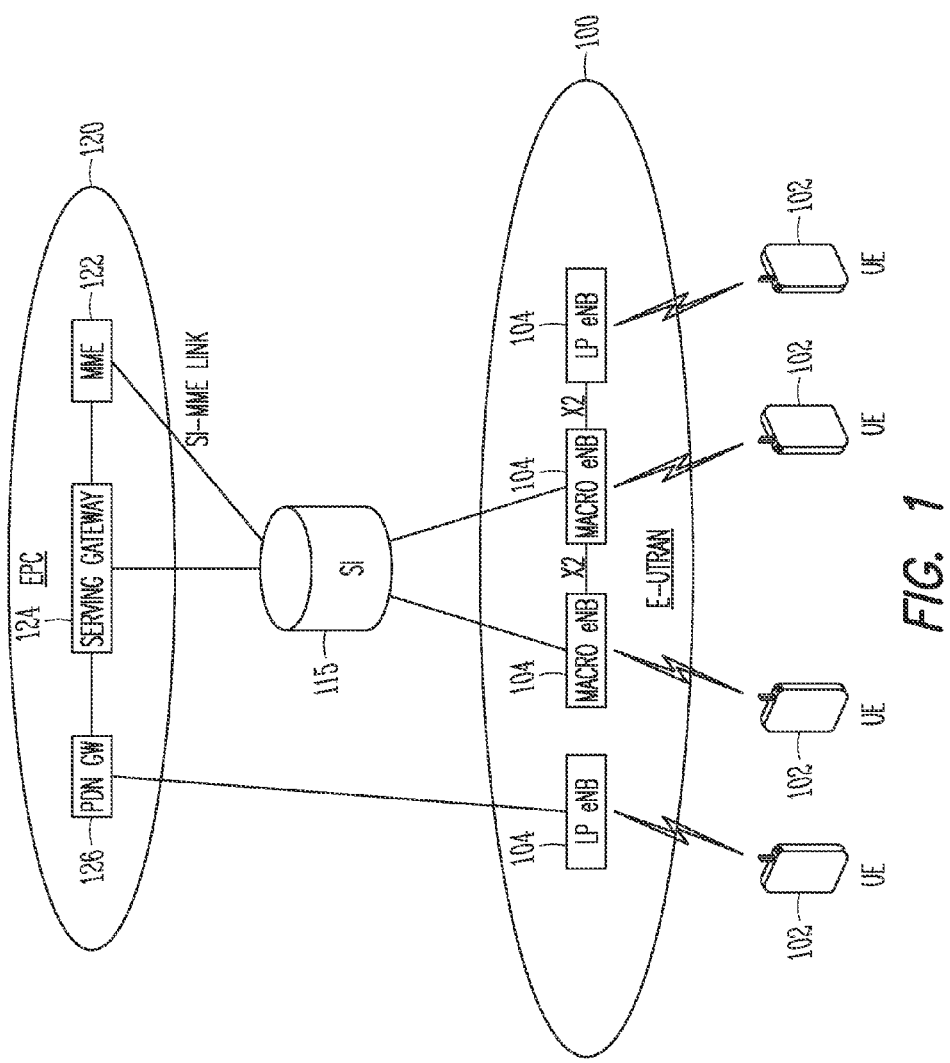
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit an aperiodic CQI type parameter to the UE 102 to be used in a determination of an aperiodic CQI measurement at the UE 102. The measurement may be based on signals transmitted from the eNB 104 and received at the UE 102, such as channel-state information reference signals (CSI-RS) and physical downlink shared channel (PDSCH) blocks, although the scope of the embodiments is not limited in this respect.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements and in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in the 3GPP LTE standards with different numbers of CCEs (e.g., aggregation level, L=1, 2, 4, or 8).

Figure 2:
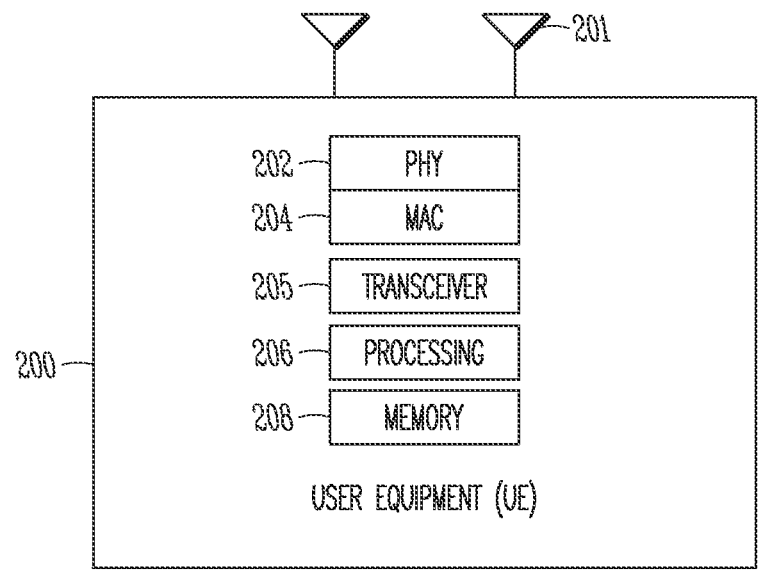
FIG. 2 is a functional diagram of a User Equipment (UE) in accordance with some embodiments.
Figure 3:
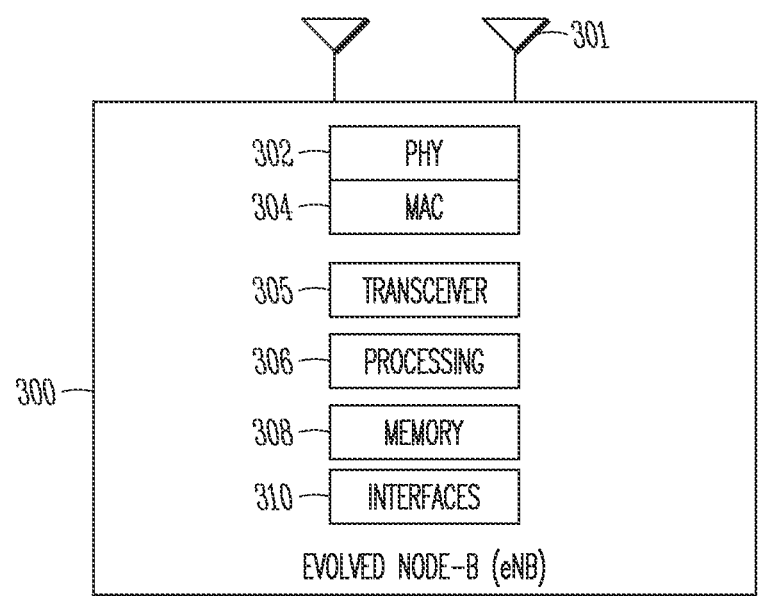
FIG. 3 is a functional diagram of an Evolved Node-B (eNB) in accordance with some embodiments.

FIG. 2 is a functional diagram of a User Equipment (UE) in accordance with some embodiments. FIG. 3 is a functional diagram of an Evolved Node-B (eNB) in accordance with some embodiments. It should be noted that in some embodiments, the eNB 300 may be a stationary non-mobile device. The UE 200 may be suitable for use as a UE 102 as depicted in FIG. 1, while the eNB 300 may be suitable for use as an eNB 104 as depicted in FIG. 1. The UE 200 may include physical layer circuitry 202 and a transceiver 205, one or both of which may enable transmission and reception of signals to and from the eNB 300, other eNBs, other UEs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the functionality described may be performed by a combination that may include one, any or all of the physical layer circuitry 202, the transceiver 205, and other components or layers.

The eNB 300 may include physical layer circuitry 302 and a transceiver 305, one or both of which may enable transmission and reception for transmission and reception of signals to and from the UE 200, other eNBs, other UEs or other devices using one or more antennas 301. The physical layer circuitry 302 and the transceiver 305 may perform various functions similar to those described regarding the UE 200 previously. Accordingly, the physical layer circuitry 302 and the transceiver 305 may be separate components or may be part of a combined component. In addition, some of the functionality described may be performed by a combination that may include one, any or all of the physical layer circuitry 302, the transceiver 305, and other components or layers.

The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, including one or more of the 3GPP LTE standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 4:
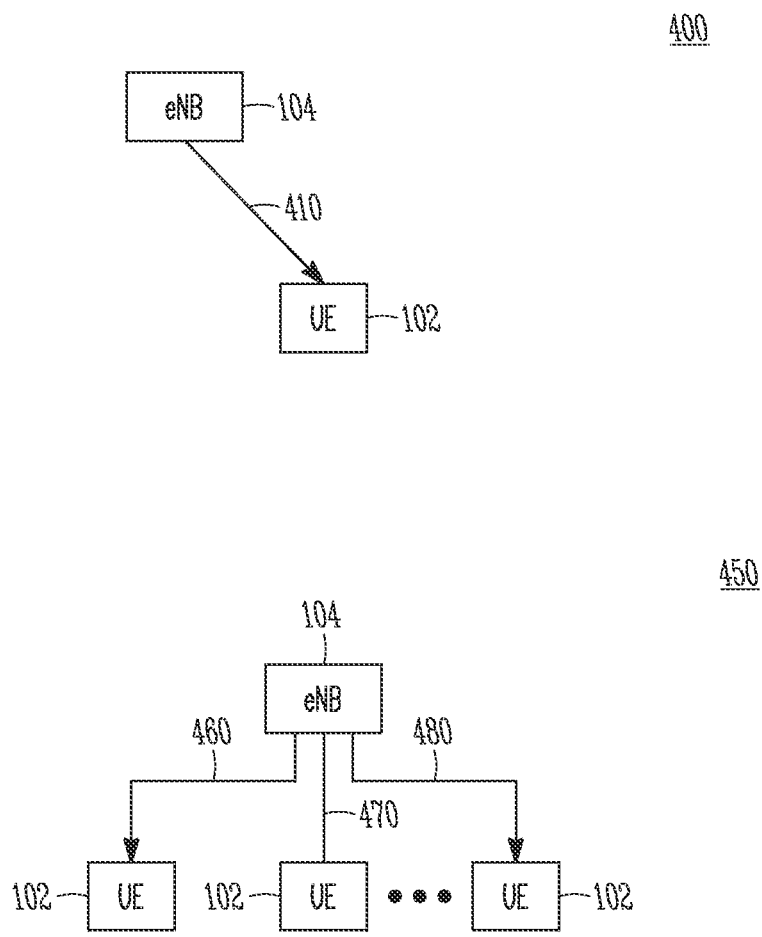
FIG. 4 illustrates examples of single-user multiple-input multiple-output (SU-MIMO) and multi-user multiple-input multiple-output (MU-MIMO) operation in accordance with some embodiments.

FIG. 4 illustrates examples of single-user multiple-input multiple-output (SU-MIMO) and multi-user multiple-input multiple-output (MU-MIMO) operation in accordance with some embodiments. It should be pointed out that the examples of SU-MIMO operation 400 and MU-MIMO operation 450 may be described in terms of downlink communication. In addition, previous discussion regarding the antennas 201, 301 used in the UE 200 and eNB 300 may be applicable to the examples in FIG. 4.

In the SU-MIMO operation 400, the eNB 104 may communicate with a single UE 102 over the wireless link 410 using a particular allocation of time and frequency resources. The link 410 may be configured for MIMO operation, in which multiple transmit antennas may be used at the eNB 104 while multiple receive antennas may be used at the UE 102. In the MU-MIMO operation 450, the eNB 104 may communicate with multiple UEs 102 over wireless links such as 460, 470, and 480, each of which may be configured for MIMO operation. The MU-MIMO communication over those wireless links 460, 470, 480 may utilize the same (or at least overlapping) allocation of time and frequency resources in some cases. Separation of signals intended for each of the UEs 102 may be performed using techniques such as beam-forming, pre-filtering, spatial separation or other techniques. Accordingly, as part of the MU-MIMO operation 450, the eNB 104 may transmit data streams to each of multiple UEs 102 simultaneously and in the same frequency band, and each data stream itself may be transmitted and received according to a MIMO configuration.

As a non-limiting example, MU-MIMO signals transmitted to a first UE 102 and a second UE 102 may include multiple PDSCH blocks in time and frequency resources that at least partly overlap. At least one of the PDSCH blocks may be intended for the first UE 102 and at least one of the PDSCH blocks may be intended for the second UE 102. It should be pointed out that usage of two UEs 102 and PDSCH blocks in this example is for illustrative purposes, and embodiments are not limited to two UEs 102 or to PDSCH blocks as part of MU-MIMO communication.

In accordance with embodiments, an aperiodic channel quality indicator (CQI) type parameter may be transmitted by the eNB 104 and may be received at the UE 102. The aperiodic CQI type parameter may indicate a CQI type for use in a determination of an aperiodic CQI based on signals received from the eNB 104. Channel-state information reference signals (CSI-RS) may be used when single-user multiple-input multiple-output (SU-MIMO) signals are received at the UE 102. Physical downlink shared channel (PDSCH) blocks may be used when multi-user multiple-input multiple-output (MU-MIMO) signals are received at the UE 102. The aperiodic CQI may be transmitted by the UE 102 to the eNB 104 as part of an aperiodic CQI measurement report. In addition, periodic CQI measurement reports may also be transmitted to the eNB 104 and may include periodic CQIs that are based on CSI-RS received at the UE 102. These embodiments are described in more detail below.

In some cases, due to beam-forming weights or other factors, CQI or other measurements may be misleading or inaccurate in MU-MIMO configurations. As an example, when the CQI is based on cell-specific reference signals (CRS) or on channel-state information reference signals (CSI-RS) of MU-MIMO signals, the CQI may not reflect actual interference that affects data blocks, such as PDSCH blocks. CQI measurements at the UE 102 may assist the eNB 104 in adjusting or adapting MU-MIMO operation for improved performance. As the CQI and other performance information may benefit system operation in this and other scenarios, there is a need for methods and systems for feedback of CQI and other performance information.

Figure 5:
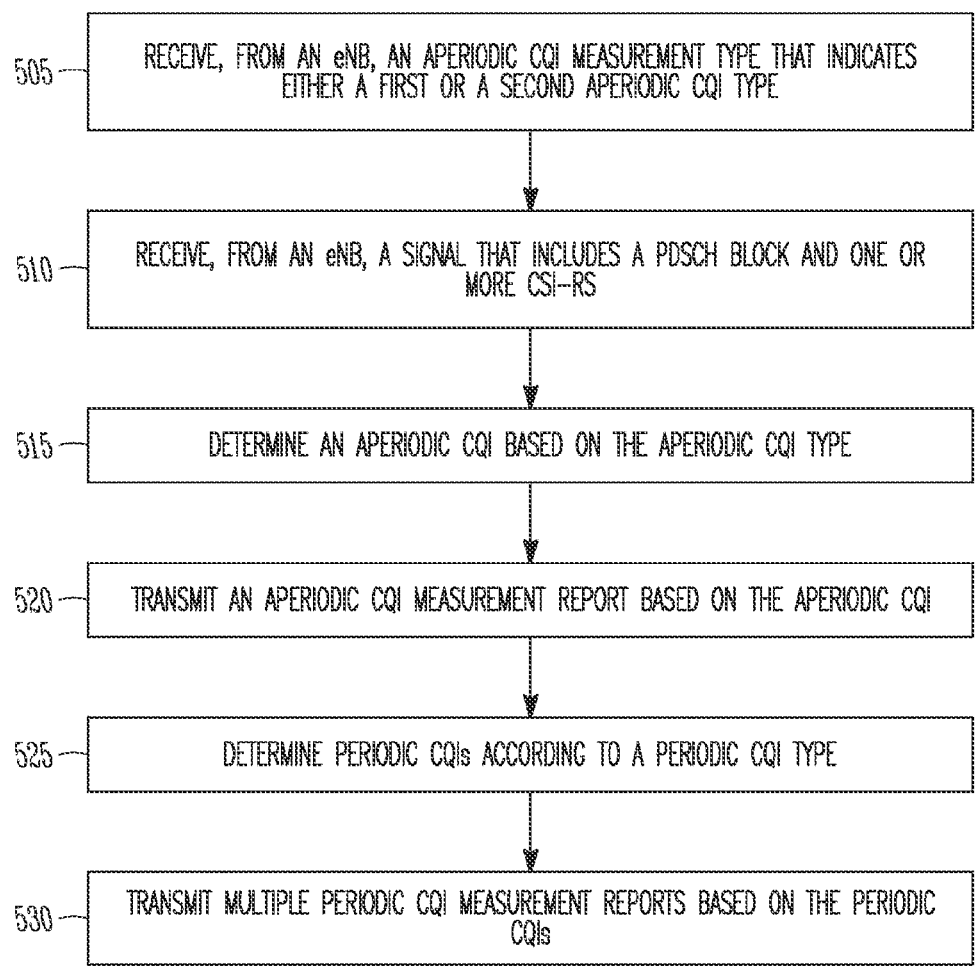
FIG. 5 illustrates the operation of a method of channel quality indicator (CQI) feedback in accordance with some embodiments.

FIG. 5 illustrates the operation of a method of channel quality indicator (CQI) feedback in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-8, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, an aperiodic channel quality indicator (CQI) type parameter may be received from the eNB 104. The aperiodic CQI type parameter may indicate either a first or a second aperiodic CQI type for use in a determination of an aperiodic CQI. In some embodiments, CQI measurement according to the first aperiodic CQI type may be based on a signal quality for one or more channel-state information reference signals (CSI-RS) received at the UE 102. In addition, CQI measurement according to the second aperiodic CQI type may be based on a signal quality for a physical downlink shared channel (PDSCH) block received at the UE 102. The signal quality used in such CQI measurements may be based on or may include a signal-to-noise ratio (SNR), signal-to-noise-plus-interference ratio (SINR) or other suitable indicator. An example of such will be given below.

Accordingly, the aperiodic CQI measurement may be based on a reception of the CSI-RS at the UE 102 or on a reception of the PDSCH block at the UE 102. These embodiments are not limiting, however, as CQI measurements on other data blocks, control blocks, messages or signals may also be used in some cases. Embodiments are also not limited to the use of only the first and second CQI types, and any suitable number of CQI types may be used. For instance, the indicated CQI type may be selected from three or more candidate CQI types in some cases.

Figure 6:
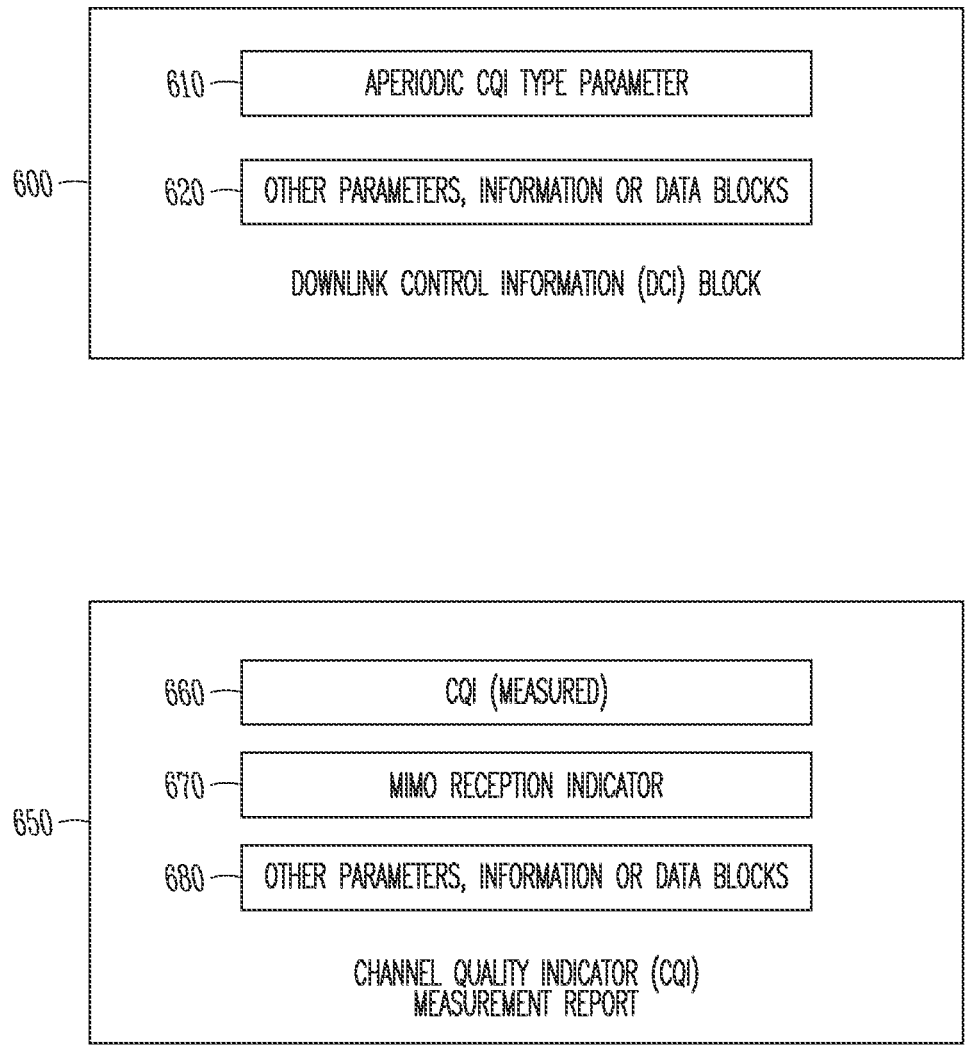
FIG. 6 illustrates example messages that may be exchanged between the UE and the eNB as part of CQI feedback in accordance with some embodiments.

FIG. 6 illustrates example messages that may be exchanged between the UE 102 and the eNB 104 as part of CQI feedback in accordance with some embodiments. The downlink control information (DCI) block 600 may take formats such as 1D, 2B, 2C, 2D or others that may be included in 3GPP or other standards, but is not so limited. The DCI block may include the aperiodic CQI type parameter 610 as shown in the example of FIG. 6, which may indicate the first or second aperiodic CQI type or other CQI type. As an example, a value of 1 for the aperiodic CQI type parameter 610 may indicate that a CQI measurement should be based on a PDSCH block while a value of 0 may indicate that the CQI measurement should not be based on the PDSCH block.

The DCI block 600 may also include other parameters, information or data blocks 620 that may or may not be related to CQI feedback. For instance, a time period for the aperiodic CQI measurement or control information for the DCI block 600 may be included. Although shown as part of the DCI block 600 in the example of FIG. 6, the aperiodic CQI type parameter 610 is not limited as such. In some embodiments, the aperiodic CQI type parameter 610 may be included in one or more other messages or signals transmitted from the eNB 104 to the UE 102.

At operation 510, a signal may be received from the eNB 104, and the signal may include one or more PDSCH blocks and one or more CSI-RS. Accordingly, CQI measurements may be based at least partly on the signal received at operation 510.

At operation 515, an aperiodic CQI may be determined according to the aperiodic CQI type indicated by the aperiodic CQI type parameter. The determination may be based on reception of SU-MIMO or MU-MIMO signals at the UE 102. The signals may be received from the eNB 104, and may include one or more CSI-RS, PDSCH blocks or other reference, data or control signals.

As a non-limiting example, the aperiodic CQI may be determined for a time period in which the UE 102 is scheduled to receive MU-MIMO signals from the eNB 104. Although not limited as such, when one or more MU-MIMO signals are scheduled for the time period, the aperiodic CQI type parameter may indicate the second aperiodic CQI type and the aperiodic CQI measurement may be based on reception of a PDSCH block. That is, the aperiodic CQI measurement may be based on one or more PDSCH blocks that are intended for the UE 102 and are received as part of one or more MU-MIMO signals. It should be pointed out that during the time period, the MU-MIMO signal(s) received may include PDSCH blocks in addition to one or more CSI-RS, although the aperiodic CQI may be based on the PDSCH blocks.

In addition, when one or more SU-MIMO signals are scheduled for the time period, the aperiodic CQI type parameter may indicate the first aperiodic CQI type and the aperiodic CQI measurement may be based on reception of CSI-RS. That is, the aperiodic CQI measurement may be based on one or more CSI-RS received as part of one or more SU-MIMO signals.

The usage of the PDSCH blocks for the aperiodic CQI measurement may be beneficial in some cases. For example, as previously described, when the CQI is based on CRS or on CSI-RS for MU-MIMO operation, the CQI may not reflect actual interference that affects the PDSCH block. Therefore, usage of the PDSCH block for CQI measurement may provide a more accurate result.

At operation 520, an aperiodic CQI measurement report may be transmitted by the UE 102. The measurement report may be based on or may include the aperiodic CQI described as part of operation 515. The aperiodic CQI may be specified using any suitable number of bits or other digits. The size of the reported CQI may be specified as part of 3GPP or other standards, but is not limited as such. The aperiodic CQI measurement report may further include a MIMO reception indicator to indicate either SU-MIMO reception at the UE 102 or MU-MIMO reception at the UE 102 during the reported aperiodic CQI measurement.

At operation 525, periodic CQIs may be determined at the UE 102 according to a periodic CQI type. As an example, the periodic CQI type to be used at the UE 102 may be communicated in one or more setup or other control messages. As another example, the periodic CQI type may be communicated to the UE 102 in a similar manner as the aperiodic CQI type previously described, such as the use of one or more DCIs. As another example, the periodic CQI type may be specified as part of 3GPP or other standards.

The periodic CQIs may be determined according to a CQI periodicity parameter that may be specified using any suitable number of sub-frames, slots, symbols or other time unit. As a non-limiting example, the periodic CQI measurement may be performed once per 10 sub-frames. As another example, the CQI periodicity parameter may be specified as part of 3GPP or other standards.

Any suitable type of periodic CQI measurement may be used, including those previously described regarding the aperiodic CQI types. As an example, the periodic CQIs may be based on a signal quality indicator for one or more CSI-RS received at the UE 102. As another example, the periodic CQIs may be based on signal qualities of PDSCH blocks or other data blocks or signals received at the UE 102. These examples are not limiting, however, and other data blocks or signals may also be used for the periodic CQI measurement type.

The periodic CQI measurements may be performed during time periods in which SU-MIMO or MU-MIMO signals are scheduled for the UE 102. As an example, at least one of the periodic CQIs may be determined during a time period in which the UE 102 is scheduled to receive SU-MIMO signals from the eNB 104. As another example, periodic CQI measurements may be performed on SU-MIMO signals scheduled for reception at regular intervals, at periodic intervals or on a regular basis. In addition to those measurements, one or more aperiodic CQI measurements may also be performed when additional MU-MIMO signals are scheduled for transmission to the UE 102.

Multiple periodic CQI measurement reports may be transmitted according to the CQI periodicity parameter at operation 530. The periodic CQI measurement reports may be based on or may include the measured periodic CQIs previously described. As an example, the periodic CQI measurement reports may include periodic CQI measurements that are based on one or more CSI-RS received at the UE 102. In addition, the CQI periodicity parameter used for the periodic CQI measurements at operation 525 may be the same as the CQI periodicity parameter used for the reporting at operation 530, but is not limited as such. In some embodiments, the periodicity parameter may reflect a time spacing between individual transmissions of the multiple periodic CQI measurement reports. The periodicity parameter may indicate a number of transmission sub-frames for the time spacing, such as one, two, 10 or other suitable number of sub-frames.

As another example, at least one of the periodic CQIs may be determined during a time period in which the UE 102 is scheduled to receive a SU-MIMO signal from the eNB 104. As another example, the periodic CQIs may even be restricted to time periods in which the UE 102 is scheduled to receive a SU-MIMO signal from the eNB 104.

Referring to FIG. 6, an example CQI measurement report 650 is shown. The CQI measurement report 650 may include the measured CQI 660 and the MIMO reception indicator 670, as previously described. As an example, the MIMO reception indicator 670 may be an "MU/SU CQI indicator" and may take a value of 1 when the CQI is based on a MU-MIMO signal (MU-CQI) and a value of 0 when the CQI is based on a SU-MIMO signal (SU-CQI). The CQI measurement report 650 may also include other parameters, information or data blocks that may or may not be related to CQI feedback. For instance, control information for the CQI measurement report 650 may be included.

As described previously, in some embodiments, both periodic and aperiodic CQI measurement reports may be sent. Accordingly, the example format of the CQI measurement report 650 may be applicable to one or both cases, although the scope of embodiments is not limited in this respect. For instance, the measured CQI 660 included in the CQI measurement report 650 may refer to an aperiodic CQI or a periodic CQI, depending on which type (e.g. aperiodic or periodic) of CQI measurement report 650 is used.

Although shown as part of the CQI measurement report 650 in the example of FIG. 6, the CQI 660 and the MIMO reception indicator 670 are not limited as such. In some embodiments, either or both of the CQI 660 and the MIMO reception indicator 670 may be included in one or more other messages or signals transmitted from the UE 102 to the eNB 104.

In some embodiments, the UE 102 may be configured to transmit an aperiodic measurement report that includes a determined aperiodic CQI for each sub-frame (or other time period) in which a MU-MIMO signal is received at the UE 102. As an example, the UE 102 may receive a MU-MIMO signal from the eNB 104 during each of a group of time periods. For each time period, the UE 102 may determine a MU-MIMO CQI based on a signal quality for a PDSCH block included in the MU-MIMO signal. The UE 102 may also transmit a measurement report for each period, which may include the MU-MIMO CQI for the time period. It should be pointed out that during each time period, the MU-MIMO signal received may include a PDSCH block in addition to one or more CSI-RS, although the aperiodic CQI may be based on the PDSCH block.

As previously described regarding FIG. 2, the UE 102 may comprise one or more antennas, which may be configured to receive the aperiodic CQI type parameter, the CSI-RS, and the PDSCH block and to transmit the aperiodic CQI measurement report. The antennas may also be configured to receive other blocks and signals and to transmit the periodic CQI measurement report. In addition, the UE 102 may be configured to operate in a Third Generation Partnership Project (3GPP) network. Accordingly, the CSI-RS and the PDSCH block previously described may be included in one or more Orthogonal Frequency Division Multiplexing (OFDM) signals. That is, the SU-MIMO and MU-MIMO signals may be or may include OFDM signals.

Figure 7:
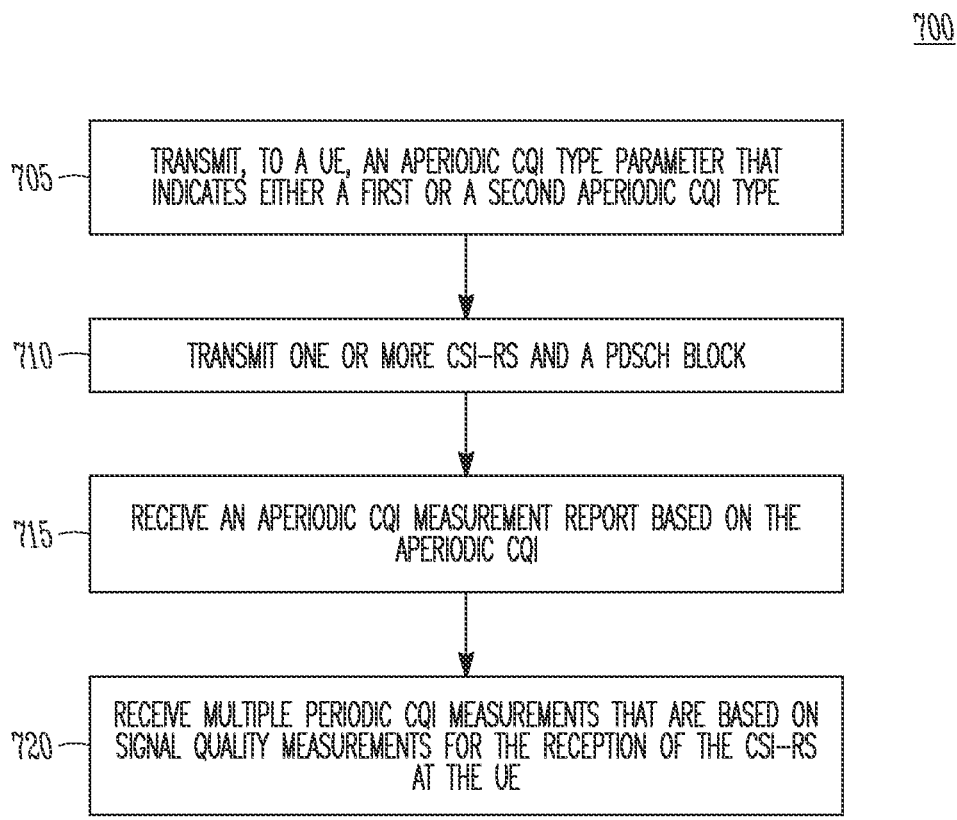
FIG. 7 illustrates the operation of another method of CQI feedback in accordance with some embodiments.

FIG. 7 illustrates the operation of another method of CQI feedback in accordance with some embodiments. As mentioned previously regarding the method 500, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6 and 8, although it is understood that the method 700 may be practiced with any other suitable systems, interfaces and components. For example, reference may be made to the scenarios described earlier in FIG. 4 for illustrative purposes, but the techniques and operations of the method 700 are not so limited. In addition, embodiments of the method 700 may refer to eNBs 104, UEs 102, APs, STAs or other wireless or mobile devices.

It should be noted that the method 700 may be practiced at an eNB 104, and may include exchanging of signals or messages with the UE 102. Similarly, the method 500 may be practiced at the UE 102, and may include exchanging of signals or messages with the eNB 104. In some cases, operations and techniques described as part of the method 500 may be relevant to the method 700. For instance, an operation of the method 500 may include reception of a block by the UE 102 while an operation of the method 700 may include transmission of the same block or similar block by the eNB 104. In addition, previous discussion of various concepts may be applicable to the method 700 in some cases, including SU-MIMO, MU-MIMO, measurement reports, CQI types, and others. Message formats shown in FIG. 6 for the DCI and CQI measurement report may also be used in some cases.

At operation 705 of the method 700, an aperiodic CQI type parameter may be transmitted to the UE 102 and may indicate either a first or a second aperiodic CQI type for use in a determination of an aperiodic CQI at the UE 102. The aperiodic CQI type parameter may be included in a DCI block 600, in some cases, but this example is not limiting. The aperiodic CQI type parameter may also be included in other messages or blocks. At operation 710, one or more CSI-RS and a PDSCH block may be transmitted to the UE 102. As previously described, the CSI-RS and the PDSCH block may be included in a SU-MIMO or in a MU-MIMO signal, in some cases.

At operation 715, an aperiodic CQI measurement report may be received and may include an aperiodic CQI measured at the UE 102 according to the aperiodic CQI type parameter. In some embodiments, for the first aperiodic CQI type, the aperiodic CQI may be based on signal quality measurements for the CSI-RS. For the second aperiodic CQI type, the aperiodic CQI may be based on a signal quality measurement for the PDSCH block.

In some embodiments, the second aperiodic CQI type may be indicated when the UE 102 is scheduled to receive a MU-MIMO signal from the eNB 104 during a CQI measurement time period. That is, the aperiodic CQI may be based on a PDSCH block included in the MU-MIMO signal. In some embodiments, the aperiodic CQI measurement report may further include a MIMO reception indicator to indicate either SU-MIMO reception at the UE 102 or MU-MIMO reception at the UE 102 for the aperiodic CQI measurement.

At operation 720, multiple periodic CQI measurements may be received at the eNB 104 according to a periodicity parameter. The periodic CQI measurements may be based on signal quality measurements for CSI-RS received at the UE 102 from the eNB 104, in some cases. In some embodiments, the periodicity parameter may reflect a time spacing between individual receptions of the multiple periodic CQI measurement reports. The periodicity parameter may indicate a number of reception sub-frames for the time spacing, such as one, two, 10 or other suitable number of sub-frames.

As previously described regarding FIG. 3, the eNB 104 may comprise one or more antennas, which may be configured to transmit the aperiodic CQI type parameter, the CSI-RS, and the PDSCH block and to receive the aperiodic CQI measurement report. The antennas may also be configured to transmit other blocks and signals and to receive the periodic CQI measurement report. In addition, the eNB 104 may be configured to operate in a Third Generation Partnership Project (3GPP) LTE or LTE-A network. Accordingly, the CSI-RS and the PDSCH block previously described may be included in one or more Orthogonal Frequency Division Multiplexing (OFDM) signals. That is, the SU-MIMO and MU-MIMO signals may be or may include OFDM signals.

Figure 8:
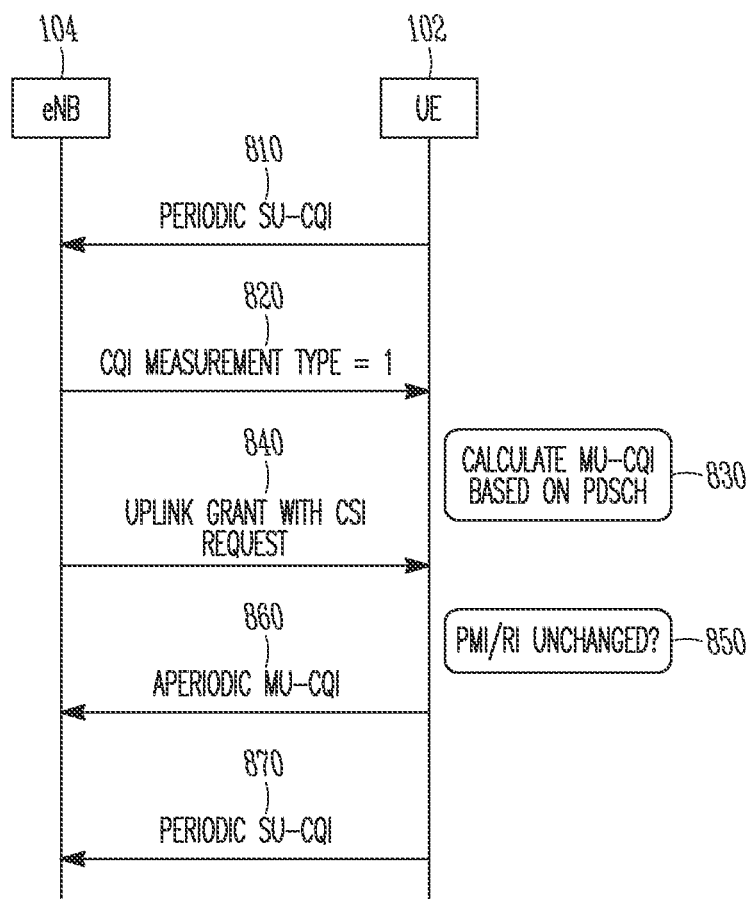
FIG. 8 illustrates the operation of another method of CQI feedback in accordance with some embodiments.

FIG. 8 illustrates the operation of another method of CQI feedback in accordance with some embodiments. It should be noted that some of the operations of the method 800 may be similar to operations included in the methods 500 or 700. In such cases, descriptions of such operations in the methods 500 or 700 may be applicable to corresponding operations included in the method 800. In addition, the method 800 shown in FIG. 8 may serve to illustrate an example of CQI feedback, but it is not limiting. Fewer or additional operations may be included in other embodiments of CQI feedback, and the chronological order of operations is not limited to that shown in FIG. 8. It should be noted that a MU-CQI may also be referred to as a MU-MIMO CQI, and may be a CQI determined for MU-MIMO operation. Similarly, a SU-CQI may also be referred to as a SU-MIMO CQI, and may be a CQI determined for SU-MIMO operation At operation 810, a periodic SU-CQI may be transmitted from the UE 102 to the eNB 104. The periodic SU-CQI may be based on CSI-RS included in SU-MIMO signals, although not limited as such. At operation 820, a CQI measurement type may be transmitted by the eNB 104 to the UE 102. As shown, when the value is set to 1, the UE 102 may calculate the MU-CQI at operation 830, and the MU-CQI may be based on a PDSCH block included in a MU-MIMO signal. The eNB 104 may transmit an uplink grant that includes a channel state information (CSI) request at operation 840.

The UE 102 may check if a Precoding Matrix Indicator (PMI) and Rank Indicator (RI) are unchanged at operation 850. That is, the UE 102 may determine values for the PMI and RI based on received signals and may compare the determined values with previously determined values of PMI and RI to check if a change has occurred. The PMI and RI may be parameters and/or measurements included in the 3GPP LTE protocol, and may be related to precoding feedback that may be used for channel dependent codebook based precoding or other operations. Embodiments are not limited to the usage of the PMI and/or RI for such feedback, however, and other parameters may also be used. When the PMI and RI are unchanged, the aperiodic MU-CQI may be based on the PDSCH block as described regarding operation 830. The UE 102 may transmit the aperiodic MU-CQI at operation 860 in a CQI measurement report and may set a MIMO reception indicator in the report to indicate that an MU-CQI is being reported. For instance, MU-MIMO reception may be indicated in the report.

When the PMI or RI is changed in comparison to previously determined values, an aperiodic CQI may be determined based on received CSI-RS instead of the PDSCH block. The aperiodic CQI may be based on CSI-RS included in the MU-MIMO signal used at operation 830, in some cases, but may also be based on CSI-RS included in other signals received at the UE 102. Accordingly, the aperiodic CQI based on the CSI-RS may be an SU-CQI. The UE 102 may transmit the SU-CQI to the eNB 104 in a CQI measurement report, and may set the MIMO reception indicator in the report to indicate that an SU-CQI is being reported. For instance, SU-MIMO reception may be indicated in the report.

Another periodic SU-CQI may be transmitted at operation 870. Additional transmissions of periodic SU-CQI not shown may also be transmitted according to a periodicity parameter, as previously described.

A non-limiting example of MU-CQI determination using a PDSCH block will be presented below, although it is understood that MU-MIMO CQIs and SU-MIMO CQIs described herein may be determined using other techniques. In this example of MU-CQI determination, the PDSCH block may be received at the UE 102 as part of an OFDM signal in which Nt transmit antennas and Nr receive antennas are used.

A received sample vector Yk of dimension (Nr×1) for the kth RE may be modeled as Yk=Hk*W*Xk+Ik+Nk. The fading matrix of dimension (Nr×Nt) may represent channel fading such that the element in the ith row and jth column represents fading on signals transmitted from the jth transmit antenna and received at the ith receive antenna. The matrix W of dimension (Nt×NL) may be a beamforming matrix for the UE 102 and NL may be a number of transmit layers. The vector Xk of dimension (NL×1) may include transmitted data symbols (representing one or more information bits) and the vector Ik of dimension (Nr×1) may represent interference that may include inter-site interference and MU-MIMO mutual interference. The vector Nk of dimension (Nr×1) may include additive white Gaussian noise.

The matrix Gk=Hk*W may be an effective channel matrix and wk may be a minimum mean-squared error (MMSE) filter based on Gk. The matrix Bk=wk*Gk may be determined, and a signal-to-noise-plus-interference ratio (SINR) may be determined as $$SINR = \frac{|Bk(i,j)|^2}{\sum_{i=j}^{i=NL}|Bk(j,i)|^2 + \sigma^2\sum_{i=1}^{i=Nr}|wk(j,i)|^2}$$

The MU-MIMO CQI may be based on the SINR determined above or an SINR determined in a similar manner. The MU-MIMO CQI may also be based on a signal-to-noise ratio (SNR) or other indicators that may be based on signal quality, signal level, noise level, interference level or other factors.

As another example, the MU-MIMO CQI may be determined using techniques such as Exponential Effective SINR Mapping (EESM), mutual information or others. In some cases, an SU-MIMO CQI may be an input to such functions to produce a MU-MIMO CQI.

An example of User Equipment (UE) is disclosed herein. The UE may comprise hardware processing circuitry configured to receive, from an Evolved Node-B (eNB), an aperiodic channel quality indicator (CQI) type parameter that indicates either a first or a second aperiodic CQI type for use in a determination of an aperiodic CQI. The hardware processing circuitry may be further configured to determine the aperiodic CQI based on the aperiodic CQI type parameter and transmit an aperiodic CQI measurement report based on the aperiodic CQI. For the first aperiodic CQI type, the aperiodic CQI may be based on a signal quality for one or more channel-state information reference signals (CSI-RS) received at the UE. For the second aperiodic CQI type, the aperiodic CQI may be based on a signal quality for a physical downlink shared channel (PDSCH) block received at the UE.

In some examples, the aperiodic CQI may be determined for a time period in which the UE is scheduled to receive a multi-user multiple-input multiple-output (MU-MIMO) signal from the eNB. In some examples, the hardware processing circuitry may be further configured to determine periodic CQIs according to a periodic CQI type and transmit multiple periodic CQI measurement reports according to a CQI periodicity parameter. The periodic CQI measurement reports may be based on the periodic CQIs.

In some examples, the periodic CQIs may be based on signal quality indicators for one or more CSI-RS received at the UE. In some examples, at least one of the periodic CQIs may be determined during a time period in which the UE is scheduled to receive a single-user multiple-input multiple-output (SU-MIMO) signal from the eNB. In some examples, the hardware processing circuitry may be further configured to receive a MU-MIMO signal from the eNB during each of a group of time periods and transmit a measurement report for each time period that includes a determined MU-MIMO CQI for the time period. The MU-MIMO CQI may be based on a signal quality for a PDSCH block received at the UE during the time period. In some examples, the MU-MIMO signal received during each time period may include the PDSCH block received at the UE during the time period and one or more CSI-RS.

In some examples, when the determination of the aperiodic CQI is for a time period in which the UE is scheduled to receive a single-user multiple-input multiple-output (SU-MIMO) signal from the eNB, the aperiodic CQI type parameter may indicate the first aperiodic CQI type. When the determination of the aperiodic CQI is for a time period in which the UE is scheduled to receive a multi-user multiple-input multiple-output (MU-MIMO) signal from the eNB, the aperiodic CQI type parameter may indicate the second aperiodic CQI type. In some examples, the aperiodic CQI type parameter may be included in a downlink control information (DCI) block.

In some examples, the aperiodic CQI measurement report may include a multiple-input multiple-output (MIMO) reception indicator to indicate either single-user MIMO (SU-MIMO) or multi-user MIMO (MU-MIMO) reception of a signal at the UE during a time period for which the aperiodic CQI is determined. The aperiodic CQI may be based at least partly on the received signal.

In some examples, the UE may further comprise one or more antennas configured to receive the aperiodic CQI type parameter, the CSI-RS, and the PDSCH block and transmit the aperiodic CQI measurement report. In some examples, the signal quality for the PDSCH block may be an output when the PDSCH block is input to a filter with weights that are based on channel coefficients between transmit antennas at the eNB and the antennas at the UE. In some examples, the MU-MIMO signal may include multiple PDSCH blocks in time and frequency resources that at least partly overlap. At least one of the multiple PDSCH blocks may be intended for the UE and at least one of the PDSCH blocks may be intended for another UE. In some examples, the UE may be configured to operate in a Third Generation Partnership Project (3GPP) network and the CSI-RS and the PDSCH block may be included in one or more Orthogonal Frequency Division Multiplexing (OFDM) signals.

An example of a method of channel quality indicator (CQI) measurement reporting at a User Equipment (UE) configured to operate in a cellular network is also disclosed herein. The method may comprise receiving, from an Evolved Node-B (eNB), an indicator for an aperiodic CQI measurement to be based on a reception of a physical downlink shared channel (PDSCH) block at the UE. The method may further comprise transmitting an aperiodic CQI measurement report that includes the aperiodic CQI measurement and transmitting multiple periodic CQI measurement reports according to a periodicity parameter. The periodic CQI measurement reports may include periodic CQI measurements that are based on one or more channel-state information reference signals (CSI-RS) received at the UE.

In some examples, the PDSCH block may be received as part of a multi-user multiple-input multiple-output (MU-MIMO) signal and the PDSCH block may be intended for the UE. The MU-MIMO signal may further include at least one PDSCH block that is intended for another UE. In some examples, the periodicity parameter may reflect a time spacing between individual transmissions of the multiple periodic CQI measurement reports and the periodicity parameter may indicate a number of transmission sub-frames for the time spacing. In some examples, the indicator for the aperiodic CQI measurement may be included in a downlink control information (DCI) block. In some examples, the aperiodic CQI measurement report may include a MIMO reception indicator that indicates either SU-MIMO or MU-MIMO reception of the PDSCH block for the aperiodic CQI measurement.

In some examples, the method may further comprise determining a Precoding Matrix Indicator (PMI) and a Rank Indicator (RI) based on one or more signals received from the eNB. When the determined PMI and RI are unchanged in comparison to previously determined PMI and RI, the aperiodic CQI measurement may be based on the reception of the PDSCH block, and the aperiodic CQI measurement report may include an indicator that the aperiodic CQI measurement is a multi-user (MU) CQI. When either of the determined PMI or RI is changed in comparison to the previously determined PMI and RI, the aperiodic CQI measurement may be based on the reception of one or more CSI-RS, and the aperiodic CQI measurement report may include an indicator that the aperiodic CQI measurement is a single-user (SU) CQI.

An example of a non-transitory computer-readable storage medium is also disclosed herein. The non-transitory computer-readable storage medium may store instructions for execution by one or more processors to perform operations for channel quality indicator (CQI) measurement reporting in a cellular network. The operations may configure the one or more processors to receive, from an Evolved Node-B (eNB), an indicator for an aperiodic CQI measurement according to either a first or a second aperiodic CQI type. The operations may further configure the one or more processors to determine an aperiodic CQI based on the aperiodic CQI type and transmit an aperiodic CQI measurement report based on the aperiodic CQI. For the first aperiodic CQI type, the aperiodic CQI may be based on a signal quality for one or more channel-state information reference signals (CSI-RS) received at the UE. For the second aperiodic CQI type, the aperiodic CQI may be based on a signal quality for a physical downlink shared channel (PDSCH) block received at the UE. In some examples, the aperiodic CQI measurement may be determined during a time period in which the UE is scheduled to receive multi-user multiple-input multiple-output (MU-MIMO) signals from the eNB.

An example of an Evolved Node-B (eNB) is also disclosed herein. The eNB may comprise hardware processing circuitry configured to transmit, to User Equipment (UE), an aperiodic channel quality indicator (CQI) type parameter that indicates either a first or a second aperiodic CQI type for use in a determination of an aperiodic CQI at the UE. The hardware processing circuitry may be further configured to transmit one or more channel-state information reference signals (CSI-RS) and a physical downlink shared channel (PDSCH) block. The hardware processing circuitry may be further configured to receive an aperiodic CQI measurement report that includes an aperiodic CQI measured at the UE according to the aperiodic CQI type parameter. For the first aperiodic CQI type, the aperiodic CQI may be based on signal quality measurements for the CSI-RS. For the second aperiodic CQI type, the aperiodic CQI may be based on a signal quality measurement for the PDSCH block.

In some examples, the second aperiodic CQI type may be indicated when the UE is scheduled to receive a multi-user multiple-input multiple-output (MU-MIMO) signal from the eNB during a CQI measurement time period. In some examples, the hardware processing circuitry may be further configured to receive, according to a periodicity parameter, multiple periodic CQI measurements that are based on signal quality measurements for CSI-RS received at the UE from the eNB. In some examples, the periodicity parameter may reflect a time spacing between individual receptions of the multiple periodic CQI measurement reports and the periodicity parameter may indicate a number of reception sub-frames for the time spacing.

In some examples, the aperiodic CQI type parameter may be included in a downlink control information (DCI) block. In some examples, the aperiodic CQI measurement report may further include a MIMO reception indicator to indicate either SU-MIMO reception at the UE or MU-MIMO reception at the UE for the aperiodic CQI measurement. In some examples, the eNB may further comprise one or more antennas configured to transmit the aperiodic CQI type parameter, the CSI-RS, and the PDSCH block and receive the aperiodic CQI measurement report.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising hardware processing circuitry configured to:
   receive, from an Evolved Node-B (eNB), an aperiodic channel quality indicator (CQI) type parameter that indicates either a first or a second aperiodic CQI type for use in a determination of an aperiodic CQI;
   determine the aperiodic CQI based on the aperiodic CQI type parameter; and
   transmit an aperiodic CQI measurement report based on the aperiodic CQI,
   wherein for the first aperiodic CQI type, the aperiodic CQI is based on a signal quality for one or more channel-state information reference signals (CSI-RS) received at the UE,
   wherein for the second aperiodic CQI type, the aperiodic CQI is based on a signal quality for a physical downlink shared channel (PDSCH) block received at the UE, and
   wherein the aperiodic CQI type parameter indicates the first aperiodic CQI type when the determination of the aperiodic CQI is for a time period in which the UE is scheduled to receive a single-user multiple-input multiple-output (SU-MIMO) signal from the eNB, and the aperiodic CQI type parameter indicates the second aperiodic CQI type when the determination of the aperiodic CQI is for a time period in which the UE is scheduled to receive a MU-MIMO signal from the eNB.

2. The UE according to claim 1, wherein the aperiodic CQI is determined for a time period in which the UE is scheduled to receive a MU-MIMO signal from the eNB.

3. The UE according to claim 2, the hardware processing circuitry further configured to:
determine periodic CQIs according to a periodic CQI type; and
transmit multiple periodic CQI measurement reports according to a CQI periodicity parameter, the periodic CQI measurement reports based on the periodic CQIs.

4. The UE according to claim 3, wherein the periodic CQIs are based on signal quality indicators for one or more CSI-RS received at the UE.

5. The UE according to claim 3, wherein at least one of the periodic CQIs is determined during a time period in which the UE is scheduled to receive a SU MIMO signal from the eNB.

6. The UE according to claim 2, wherein the MU-MIMO signal includes multiple PDSCH blocks in time and frequency resources that at least partly overlap, at least one of the multiple PDSCH blocks is intended for the UE, and at least one of the PDSCH blocks is intended for another UE.

7. The UE according to claim 2, wherein:
the UE is configured to operate in a Third Generation Partnership Project (3GPP) network; and
the CSI-RS and the PDSCH block are included in one or more Orthogonal Frequency Division Multiplexing (OFDM) signals.

8. The UE according to claim 1, the hardware processing circuitry further configured to:
receive a MU-MIMO signal from the eNB during each of a group of time periods; and
transmit a measurement report for each time period that includes a determined MU-MIMO CQI for the time period, the MU-MIMO CQI based on a signal quality for a PDSCH block received at the UE during the time period.

9. The UE according to claim 8, wherein the MU-MIMO signal received during each time period includes the PDSCH block received at the UE during the time period and one or more CSI-RS.

10. The UE according to claim 1, wherein the aperiodic CQI type parameter is included in a downlink control information (DCI) block.

11. The UE according to claim 1, wherein:
the aperiodic CQI measurement report includes a MIMO signal reception indicator to indicate either SU-MIMO or MU-MIMO reception of a signal at the UE during a time period for which the aperiodic CQI is determined; and
the aperiodic CQI is based at least partly on the received signal.

12. The UE according to claim 1, the UE further comprising one or more antennas configured to:
receive the aperiodic CQI type parameter, the CSI-RS, and the PDSCH block; and
transmit the aperiodic CQI measurement report.

13. The UE according to claim 12, wherein the signal quality for the PDSCH block is an output when the PDSCH block is input to a filter with weights that are based on channel coefficients between transmit antennas at the eNB and the antennas at the UE.

14. The UE according to claim 1, wherein the hardware processing circuitry is further configured to receive a downlink control information (DCI) block comprising a time period for measurement of the aperiodic CQI.

15. A method of channel quality indicator (CQI) measurement reporting at a User Equipment (UE) configured to operate in a cellular network, the method comprising:
receiving, from an Evolved Node-B (eNB), an indicator for an aperiodic CQI measurement to be based on a reception of a physical downlink shared channel (PDSCH) block at the UE;
transmitting an aperiodic CQI measurement report that includes the aperiodic CQI measurement; and
transmitting multiple periodic CQI measurement reports according to a periodicity parameter, the periodic CQI measurement reports including periodic CQI measurements that are based on one or more channel-state information reference signals (CSI-RS) received at the UE, and
wherein the aperiodic CQI measurement report includes a multiple-input multiple-output (MIMO) reception indicator that indicates either single-user MIMO (SU-MIMO) or multi-user MIMO (MU-MIMO) reception of the PDSCH block for the aperiodic CQI measurement.

16. The method according to claim 15, wherein:
the PDSCH block is received as part of a MU-MIMO signal and the PDSCH block is intended for the UE; and
the MU-MIMO signal further includes at least one PDSCH block that is intended for another UE.

17. The method according to claim 15, wherein:
the periodicity parameter reflects a time spacing between individual transmissions of the multiple periodic CQI measurement reports; and
the periodicity parameter indicates a number of transmission sub-frames for the time spacing.

18. The method according to claim 15, wherein the indicator for the aperiodic CQI measurement is included in a downlink control information (DCI) block.

19. The method according to claim 15, wherein:
the method further comprises determining a Precoding Matrix Indicator (PMI) and a Rank Indicator (RI) based on one or more signals received from the eNB;
when the determined PMI and RI are unchanged in comparison to previously determined PMI and RI, the aperiodic CQI measurement is based on the reception of the PDSCH block, and the aperiodic CQI measurement report includes an indicator that the aperiodic CQI measurement is a multi-user (MU) CQI; and
when either of the determined PMI or RI is changed in comparison to the previously determined PMI and RI, the aperiodic CQI measurement is based on the reception of one or more CSI-RS, and the aperiodic CQI measurement report includes an indicator that the aperiodic CQI measurement is a single-user (SU) CQI.

20. A non-transitory computer-readable storage medium that stores instructions for execution by one or more processors to perform operations for channel quality indicator (CQI) measurement reporting in a Third Generation Partnership Project (3GPP) cellular network, the operations to configure the one or more processors to:
receive, from an Evolved Node-B (eNB), an indicator for an aperiodic CQI measurement according to either a first or a second aperiodic CQI type;
determine an aperiodic CQI based on the aperiodic CQI type; and
transmit an aperiodic CQI measurement report based on the aperiodic CQI, wherein for the first aperiodic CQI type, the aperiodic CQI is based on a signal quality for one or more channel-state information reference signals (CSI-RS) received at the UE;

wherein for the second aperiodic CQI type, the aperiodic CQI is based on a signal quality for a physical downlink shared channel (PDSCH) block received at the UE, and wherein the aperiodic CQI is determined for a time period in which the UE is scheduled to receive multi-user multiple-input multiple-output (MU-MIMO) signals from the eNB.

21. An Evolved Node-B (eNB) comprising hardware processing circuitry configured to:
   transmit, to User Equipment (UE), an aperiodic channel quality indicator (CQI) type parameter that indicates either a first or a second aperiodic CQI type for use in a determination of an aperiodic CQI at the UE;
   transmit one or more channel-state information reference signals (CSI-RS) and a physical downlink shared channel (PDSCH) block; and
   receive an aperiodic CQI measurement report that includes an aperiodic CQI measured at the UE according to the aperiodic CQI type parameter;
   wherein for the first aperiodic CQI type, the aperiodic CQI is based on signal quality measurements for the CSI-RS, and
   wherein for the second aperiodic CQI type, the aperiodic CQI is based on a signal quality measurement for the PDSCH block, and
   wherein the aperiodic CQI is determined for a time period in which the UE is scheduled to receive a multi-user multiple-input multiple-output (MU-MIMO) signal from the eNB.

22. The eNB according to claim 21, the hardware processing circuitry further configured to receive, according to a periodicity parameter, multiple periodic CQI measurements that are based on signal quality measurements for CSI-RS received at the UE from the eNB.

23. The eNB according to claim 22, wherein:
   the periodicity parameter reflects a time spacing between individual receptions of the multiple periodic CQI measurement reports; and
   the periodicity parameter indicates a number of reception sub-frames for the time spacing.

24. The eNB according to claim 21, wherein the aperiodic CQI type parameter is included in a downlink control information (DCI) block.

25. The eNB according to claim 21, wherein the aperiodic CQI measurement report further includes a MIMO reception indicator to indicate either SU-MIMO reception at the UE or MU-MIMO reception at the UE for the aperiodic CQI measurement.

26. The eNB according to claim 21, the eNB further comprising one or more antennas configured to:
   transmit the aperiodic CQI type parameter, the CSI-RS, and the PDSCH block; and
   receive the aperiodic CQI.

* * * * *